US012630390B2

(12) United States Patent
Talonen et al.

(10) Patent No.: US 12,630,390 B2
(45) Date of Patent: May 19, 2026

(54) ELEVATOR CAR ROOF SYSTEM AND A CONTROL SYSTEM FOR MONITORING AN OPENING STATE OF AN ELEVATOR CAR ROOF

(71) Applicant: KONE Corporation, Helsinki (FI)

(72) Inventors: Tapani Talonen, Helsinki (FI); Pekka Halonen, Helsinki (FI); Jari Kantola, Helsinki (FI); Tapio Siironen, Helsinki (FI); Aleksi Immonen, Helsinki (FI); Juha-Matti Aitamurto, Helsinki (FI); Ari Jussila, Helsinki (FI); Ville Myyryläinen, Helsinki (FI)

(73) Assignee: KONE Corporation, Helsinki (FI)

(*) Notice: Subject to any disclaimer, the term of this patent is extended or adjusted under 35 U.S.C. 154(b) by 1425 days.

(21) Appl. No.: 17/158,507

(22) Filed: Jan. 26, 2021

(65) Prior Publication Data

US 2021/0269279 A1 Sep. 2, 2021

(30) Foreign Application Priority Data

Feb. 28, 2020 (EP) .................................... 20160224

(51) Int. Cl.
*B66B 1/30* (2006.01)
*B66B 11/02* (2006.01)

(52) U.S. Cl.
CPC ............ *B66B 1/30* (2013.01); *B66B 11/0246* (2013.01)

(58) Field of Classification Search
CPC ..... B66B 1/30; B66B 11/0246; B66B 5/0087; B66B 5/005; B66B 11/0226
See application file for complete search history.

(56) References Cited

U.S. PATENT DOCUMENTS 10,618,778 B2 * 4/2020 Hu ...................... B66B 11/0233
2005/0224299 A1 10/2005 Soemardjan et al.
2018/0105394 A1 * 4/2018 Hill ..................... B66B 11/0233
(Continued)

FOREIGN PATENT DOCUMENTS

CN 109476456 A 3/2019
EP 3 097 036 11/2016
(Continued)

OTHER PUBLICATIONS

English translation of the Japanese Office Action for Japanese Application No. 2021-029419, dated Mar. 19, 2025.
(Continued)

*Primary Examiner* — Jeffrey Donels
(74) *Attorney, Agent, or Firm* — Birch, Stewart, Kolasch & Birch, LLP

(57) ABSTRACT

An elevator car roof system is provided for monitoring safety of a service access located on an elevator car roof. The elevator car roof system may monitor a change in an opening state of the elevator car roof. Positions of a plurality of roof panels may indicate when the elevator car roof is partially open, fully open or fully closed. The positions of the roof panels may cause at least one sensor of the elevator car roof system to provide a signal to a control system of the elevator. Further, the elevator car roof system may detect if there is an object on the roof. Based on the detected object on the roof, the elevator car roof system may provide at least one signal to enable controlling operation of the elevator.

20 Claims, 9 Drawing Sheets

(56) References Cited

U.S. PATENT DOCUMENTS

| | | | | |
|---|---|---|---|---|
| 2018/0162698 | A1* | 6/2018 | Hu | B66B 11/0233 |
| 2019/0119073 | A1 | 4/2019 | Haapaniemi et al. | |
| 2020/0031625 | A1* | 1/2020 | Vicente | B66B 11/0246 |
| 2020/0331726 | A1* | 10/2020 | Jagdale | B66B 11/0226 |

FOREIGN PATENT DOCUMENTS

| | | | |
|---|---|---|---|
| JP | 2015-27898 | A | 2/2015 |
| JP | 2016-222415 | A | 12/2016 |
| WO | WO 2015/110697 | A1 | 7/2015 |
| WO | WO 2018/011463 | A1 | 1/2018 |
| WO | WO 2018/104578 | A1 | 6/2018 |

OTHER PUBLICATIONS

European Search Report issued in EP 20160224.0, dated Sep. 14, 2020.

* cited by examiner

ELEVATOR CAR ROOF SYSTEM AND A CONTROL SYSTEM FOR MONITORING AN OPENING STATE OF AN ELEVATOR CAR ROOF

TECHNICAL FIELD

Various example embodiments generally relate to the field of safety systems. In particular, some example embodiments relate to monitoring opening of a service access on elevator car roof and detecting objects on the elevator car roof.

BACKGROUND

In a no-headroom or low-headroom elevator, the height of the shaft is such that a person or an object on the elevator car roof will be crushed when the elevator car approaches the top landing. For the overall safety of such elevators, it is imperative to monitor that there is no undue presence on the elevator car roof when the elevator is in operation. For such elevators, one way of providing the necessary safety or refuge space for elevator maintenance operations, such as service and inspection for components in an elevator shaft, is to establish it inside the elevator car. The maintenance may be performed, for example, through an opened car ceiling and roof, flooring or walls or through open car doors. In this case, the permanent and natural refuge space is located at least partially inside the elevator car. In the above-mentioned applications, a car inspection drive may be performed from inside the elevator car by using an opened car roof as the service access to the elevator shaft above the car.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide an elevator car roof system for providing a safe and an easy access for elevator maintenance by monitoring an opening state of an elevator car roof. In an example embodiment, the elevator car roof system enables an object detection on top of the elevator car roof to further enhance the safety. These benefits may be achieved by the features of the independent claims. Further implementation forms are provided in the dependent claims, the description, and the drawings.

According to a first aspect, there is provided an elevator car roof system. The elevator car roof system comprises a plurality of movable roof panels forming an elevator car roof, and at least one sensor configured to indicate positions of the roof panels and to detect an object on at least one roof panel, the positions comprising at least a first state in which the roof is fully closed, a second state in which the roof is fully open and a third state in which the roof is partially open. The at least one sensor is configured to enable normal elevator operation only in the first state when no object is detected on the roof, the at least one sensor is configured to disable any elevator operation in the third state or when the object is detected on the roof, and the at least one sensor is configured to enable an elevator inspection drive only in the second state.

In an example embodiment, the roof is partially open when at least one roof panel has turned away from a plane of an elevator car roof relative to a longitudinal axis of the roof panel.

In an example embodiment, the roof is fully open when all roof panels have turned away from the plane of the elevator car roof relative to the longitudinal axis of the roof panels and moved to one side of the elevator car roof opening.

In an example embodiment, wherein the roof is fully closed when the roof panels are positioned side by side in the same plane, covering the whole area of the elevator car roof opening.

In an example embodiment, the at least one sensor comprises a first sensor, a second sensor and a third sensor, and wherein the system further comprises a frame of the elevator car roof; a first folding lever movably coupled to one side of the frame, and a second folding lever movably coupled on the opposite side of the frame than the first folding lever. The first folding lever is configured to enable triggering of at least one of the first sensor and the second sensor, and the second folding lever is configured to enable triggering of the third sensor.

In an example embodiment, in the first state and when weight is applied on any of the roof panels, the first folding lever is configured to trigger the first sensor.

In an example embodiment, in the third state, the first folding lever is configured to trigger the first sensor and the second sensor.

In an example embodiment, in the second state, the second folding lever is configured to trigger the third sensor to override the first sensor and the second sensor, to enable an inspection drive.

In an example embodiment, the system further comprises at least one pushing member associated with each roof panel arranged to face the first folding lever, and wherein when weight is applied if the first state, the at least one pushing member is configured to move the first folding lever and in response to the movement, the first folding lever is configured to trigger the first sensor.

In an example embodiment, the first folding lever extends along the whole side of the frame.

In an example embodiment, the second folding lever extends only partially along the side of the frame.

According to a second aspect, there is provided a control system of an elevator. The control system is configured to receive at least one signal from at least one sensor of the elevator car roof system of first aspect or any of its example embodiments and control operation of the elevator based on the at least one signal.

According to a third aspect, there is provided an elevator comprising the elevator car roof system of the first aspect and the control system of the second aspect.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

According to an example embodiment, an elevator car roof system is provided for monitoring safety of a service access located on an elevator car roof. The elevator car roof system may monitor a change in an opening state of the elevator car roof. Positions of a plurality of roof panels may indicate when the elevator car roof is partially open, fully open or fully closed. The positions of the roof panels may cause at least one sensor of the elevator car roof system to provide a signal to a control system of the elevator. Further, the elevator car roof system may detect if there is an object on the roof. Based on the detected object on the roof, the elevator car roof system may provide at least one signal to enable controlling operation of the elevator. The elevator car roof system may, for example, enable or disable normal operation of the elevator, or enable or disable performing an inspection drive on the elevator.

The monitoring mechanism may comprise a plurality of roof panels within a frame of the car roof. The roof panels may form a platform on the car roof when they are closed, i.e. the elevator car roof top. The roof panels may be separate or connected, and they may be moved such that they are stowable or foldable on one end or side of the frame of the elevator car roof. Hence, the elevator car roof may be fully opened to provide a service access from inside the elevator car. Further, the stowing or folding of the panels on one side may enable that visibility to the elevator shaft is not blocked by the roof when the roof is opened. A normal operation of the elevator may be enabled only when the elevator car roof is fully closed and there is no object on the elevator car roof. An inspection drive may only be enabled when the elevator car roof is fully opened. This is enabled by monitoring the opening state of the roof panels and, respectively, the opening state of the elevator car roof. For enhanced safety, the elevator car roof system may further detect objects on the roof panels and restrain operation of the elevator in response to detecting an object on at least one panel. The solution may provide a safe and a practical service access from the elevator car to the shaft.

Figure 1:
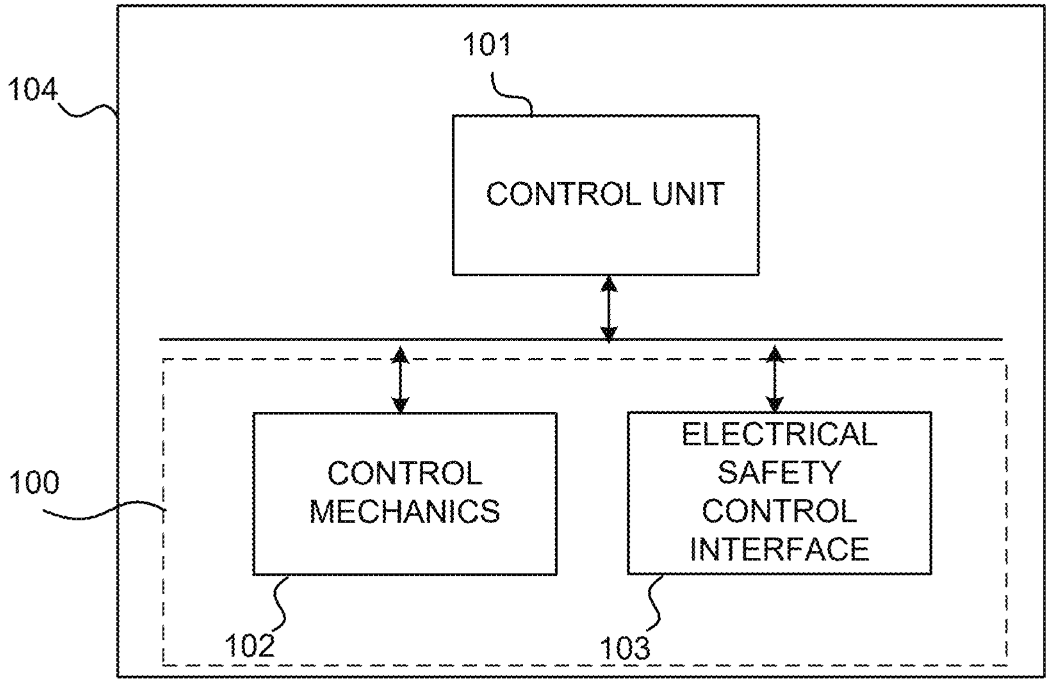
FIG. 1 illustrates a schematic representation of a control system of an elevator comprising an elevator car roof system according to an example embodiment.

FIG. 1 illustrates a schematic representation of a control system 104 of an elevator system comprising an elevator car roof system 100 according to an embodiment. Although the control system 104 is illustrated as a single device, it is appreciated that, wherever applicable, functions of the control system 104 may be distributed to a plurality of devices.

The control system 104 may comprise a control unit 101, such as an elevator controller. The control unit 101 may comprise at least one processor, for example, one or more of various processing devices, such as for example a co-processor, a microprocessor, a controller, a programmable logic controller (PLC), a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The control unit 101 may further comprise at least one memory. The memory may be configured to store, for example, computer program code or the like, for example operating system software and application software. The memory may comprise one or more volatile memory devices, one or more non-volatile memory devices, and/or a combination thereof. For example, the memory may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.). The control system 104 may comprise the elevator car roof system 100. The elevator car roof system 104 may comprise an electrical safety control interface 103 configured to provide signals for the control unit 101. The electrical safety control interface 103 may comprise, for example, one or more sensors or switches connected to the control unit 101. The electrical safety control interface 103 may further comprise one or more safety input modules configured to detect safety-related switching states of the sensors such as position switches, safety contacts, magnetic switches, roll safety switches, or the like. In an example embodiment, the safety input modules may comprise instructions to turn on and off outputs based on input conditions and an internal program. The instruction may be stored, for example, on a PLC configured in the safety input module. Alternatively, the safety input modules may provide output signals based on the input conditions for a separate controller, such as the control unit 101. In an embodiment, the control unit 101 may be integrated on the one or more safety input modules. The electrical safety control interface 103 may further comprise a communication interface configured to enable the elevator car roof system 100 to transmit and/or receive information, to/from other devices, such as service or maintenance devices, or the like.

The elevator car roof system 100 may further comprise control mechanics 102 configured to trigger the input signals by the electrical safety control interface 103 to the control unit 101. The control mechanics 102 may comprise, for example, one or more levers configured to trigger one or more sensors. For example, the levers may be configured to change a state of at least one switch in response to a changed position of the one or more levers. The control mechanics 102 may further comprise a plurality of panels, such as folding panels, hinged swing plates and/or floating plates. In an example embodiment, the roof panels are movably coupled within a frame of an elevator car roof as separate panels. In another example embodiment, the roof panels may be interconnected. The roof panels may be associated with the at least one sensor such that changed positions of the roof panels cause changes in states of the sensors. Each roof panel may be configured to be movable horizontally and vertically or to be pivotable. In an example embodiment, the one or more levers may be provided operatively coupled to the roof panels. Changes in positions of the roof panels may move the one or more levers. The elevator car roof system 100 may further comprise one or more springs coupled with the one or more levers and/or plates for keeping and/or returning the one or more levers and/or plates in a default position.

The functionality described herein may be performed, at least in part, by one or more computer program product components such as software components. According to an embodiment, the elevator car roof system comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAS), application-specific Integrated Circuits (ASICS), application-specific Standard Products (ASSPS), System-on-a-chip systems (SOCs), Complex Programmable Logic Devices (CPLDs), Graphics Processing Units (GPUs).

Figure 2A:
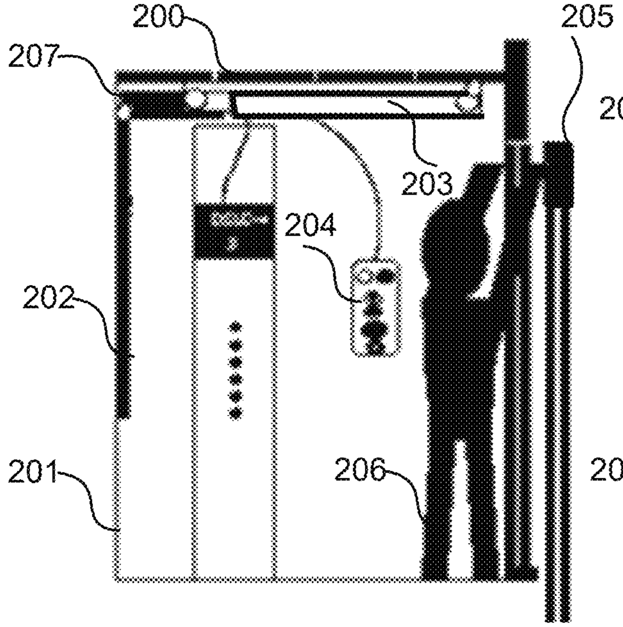
FIG. 2A illustrates a schematic representation of an elevator service access when an elevator car roof is fully closed according to an example embodiment.

FIG. 2A illustrates a schematic representation of an elevator service access when an elevator car roof is fully closed according to an example embodiment.

An elevator car 201 may comprise a car ceiling panel 202, which is opened inside the elevator car 201. The elevator car roof may comprise a plurality of separately movable roof panels 200 within a frame of an elevator car top. In another example embodiment, the roof panels may be interconnected. The plurality of roof panels 200 may fill the frame so that they form a uniform surface within the frame. The plurality of roof panels 200 may form an outer surface of the elevator car roof, which may be used for service access. A working platform 203 for service and inspection purposes may be stored inside the elevator car roof, between the car ceiling panel 202 and the plurality of roof panels 200. When the service access located on the roof is closed, the maintenance person 206 may, for example, work on landing door components 205 through an opened car door. The elevator car 201 may further comprise a car connection board 207. The car connection board 207 may provide an interface for internal and external inputs/outputs. For example, the car connection board 207 may connect input signals from sensors coupled with the elevator car roof elements 202, 200 and a control unit of the elevator. An inspection drive unit 204 may be coupled to the car connection board 207 by the maintenance person 206 to receive information about a state of the elevator and to switch on an inspection mode of the elevator. While the elevator car roof service access is fully closed, a normal operation of the elevator may be allowed.

Figure 2B:
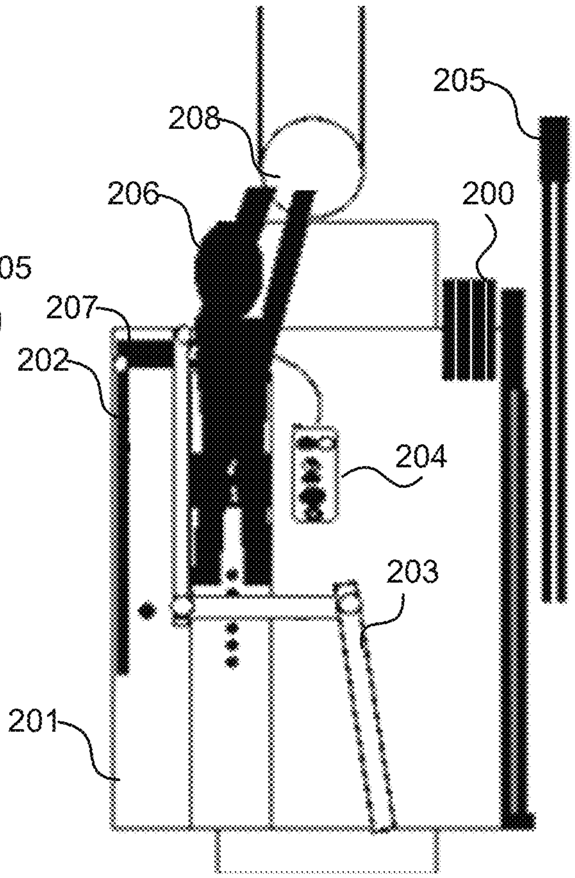
FIG. 2B illustrates a schematic representation of an elevator service access when an elevator car roof is fully open according to an example embodiment.

FIG. 2B illustrates a schematic representation of the elevator service access of FIG. 2A when the elevator car roof is fully open according to an example embodiment. The plurality of roof panels 200 may be moved separately or in connection with each other and stowed or folded on one side of the elevator car roof opening to open the elevator car roof by a maintenance person 206 to form an open service access to the shaft. A roof panel may be in the opened position, when the panel is turned away from the plane of the frame, being preferably orthogonal to the plane of the frame. In the orthogonal position, the roof panels may be stowed in a smaller space next to each other to the one end of the frame. The working platform 203 may be folded downwards from the elevator car roof to provide a standing platform for the maintenance person 206. The elevator car roof service access may enable service work on shaft components 208 located above the elevator car 201. The shaft components 208 may comprise, for example, a motor and a counterweight of the elevator.

Stacking the roof panels 200 on the one end of the elevator car top frame may enable providing a refuge space inside the elevator car 201 to the maintenance person 206. Further, the arrangement of stowing aside the roof panels 200 may enable providing a wider service access, for example, compared to having a roof which rises upwards outside the elevator car 201. The stowing aside of the roof panels 200 may further overcome safety risks because visibility to the shaft is not blocked by the roof component rising outside the elevator car 201. Good visibility to the elevator shaft is important during driving in inspection drive mode in the up direction. Further, maintenance and inspection operations may be a performed more easily compared to a rising elevator car roof solution. For example, by sliding and stowing the elevator car roof to one side, the maintenance person is able to replace ropes and a machine located on top of the car with less effort than in case of the rising elevator car roof. The changing operations would be time-consuming with the rising roof because the roof would need to be removed completely before the replacements can be done. Furthermore, maintenance of the landing door components 205 may be performed via the roof service access instead of the opened elevator door.

When the inner ceiling 202 and the outer elevator car roof are fully open by stowing aside the roof panels 200, normal operation of the elevator may be disabled. The maintenance person 206 may switch an inspection mode from the engaged inspection drive unit 204, and the inspection drive may be allowed by the control unit via the car connector board 207 after detecting that the elevator car roof is fully open.

Figure 2C:
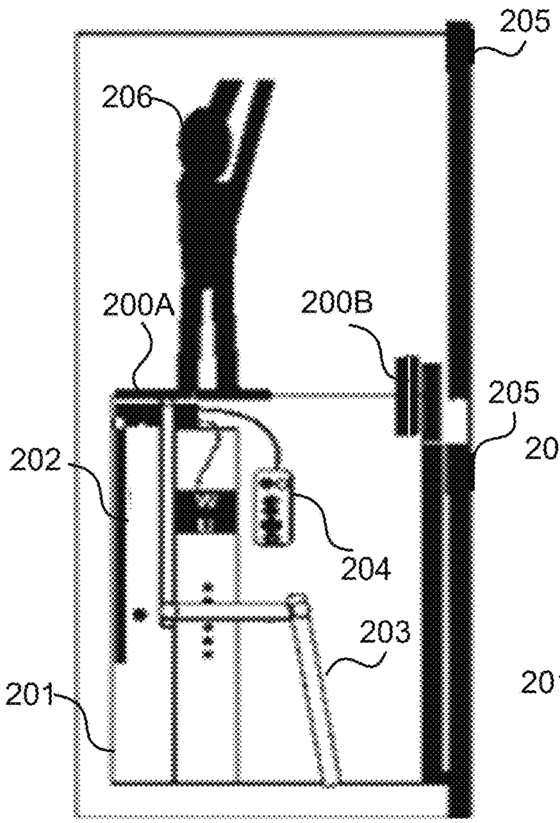
FIG. 2C illustrates a schematic representation of an elevator service access when there is an object on an elevator car roof according to an example embodiment.
Figure 2D:
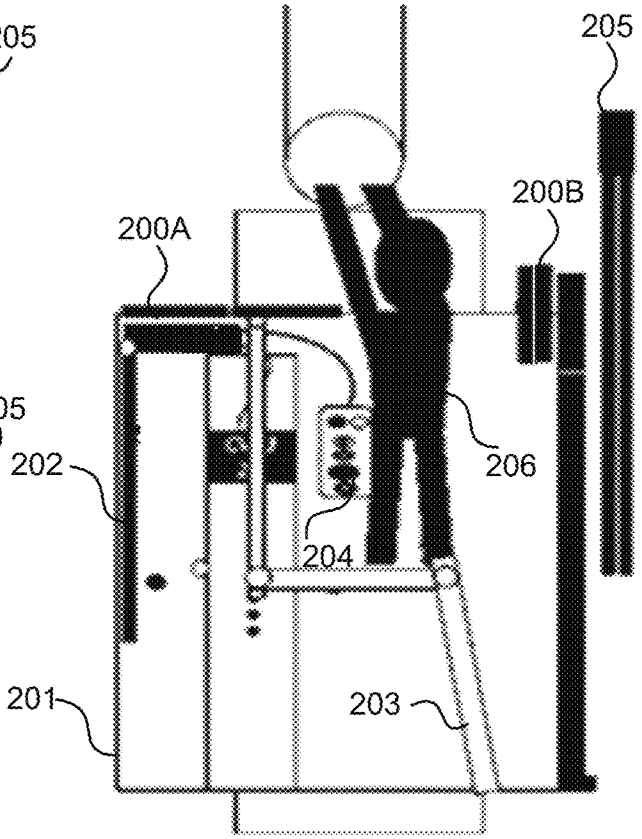
FIG. 2D illustrates a schematic representation of an elevator service access when an elevator car roof is partially open according to an example embodiment.

FIGS. 2C and 2D illustrate the elevator 201 of FIGS. 2A and 2B, when the elevator car roof is partially open.

In FIG. 2C the maintenance person 206 is standing on the partially closed elevator car roof on top of roof panels 200A which are in a closed position in a plane of the frame of the car top. One or more of the roof panels 200B are in the opened position stowed aside on one end of the frame. If the elevator 201 moves while there is a person on the roof, there is a risk of crushing due to insufficient free space above the elevator car. To ensure safety, the panels 200A, 200B may comprise elements that enable detecting an object on the roof panels. The elements may be configured to trigger a signal to the car connection board 207 informing about a detected object.

The control unit may further ensure that an inspection or a service drive is allowed only when there is a sufficient refuge space for the maintenance person. Therefore, a control signal allowing the inspection drive may be triggered only when all the panels 200A, 200B are in the opened position and stowed aside at the same end of the frame. In FIG. 2D, the maintenance person 206 is working from a narrow opening because the elevator car roof is not fully open. The refuge space may not be readily available due to the inconvenient working space and thus the inspection drive is disabled for safety.

Figure 3:
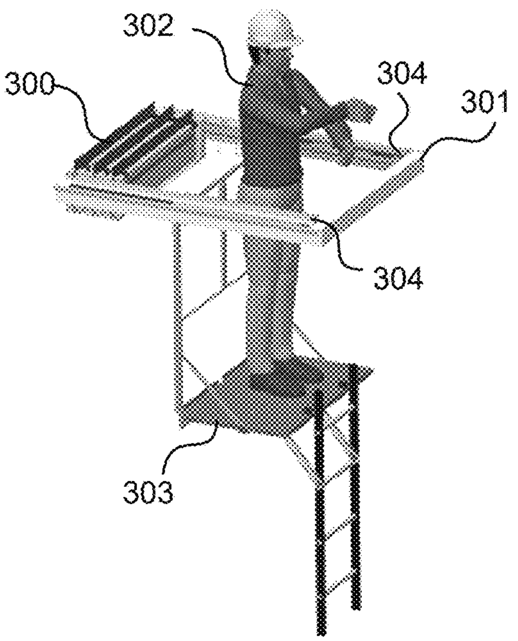
FIG. 3 illustrates a schematic representation of an elevator service access when an elevator car roof is fully open depicted from an oblique point of view according to an example embodiment.

FIG. 3 illustrates a schematic representation of an elevator service access when the elevator car roof is fully open depicted from an oblique point of view according to an example embodiment. The elevator service access may comprise a plurality of roof panels 300 within an elevator car top frame 301. Dimensions of the roof panels 300 may correspond to the width of the frame 301 and to the length of the frame 301 divided by the number of the panels 300. Sliding rails 304 may be coupled on both sides of the frame 301. The sliding rails 304 may be configured on any opposite sides of the frame 304. The roof panels 300 may be movable along the sliding rails 304. The roof panels 300 may be further movable in relation to their longitudinal axis. Each of the roof panels 300 may be separately turned orthogonally in relation to the plane of the frame and slid to one end of the frame. When the plurality of roof panels 300 are stowed aside on the one end of the frame 301, the elevator service access may be provided for a maintenance person 302. The maintenance person 302 may easily perform maintenance operations via the fully open panel roof, for example, by standing on a working platform 303.

Figure 4:
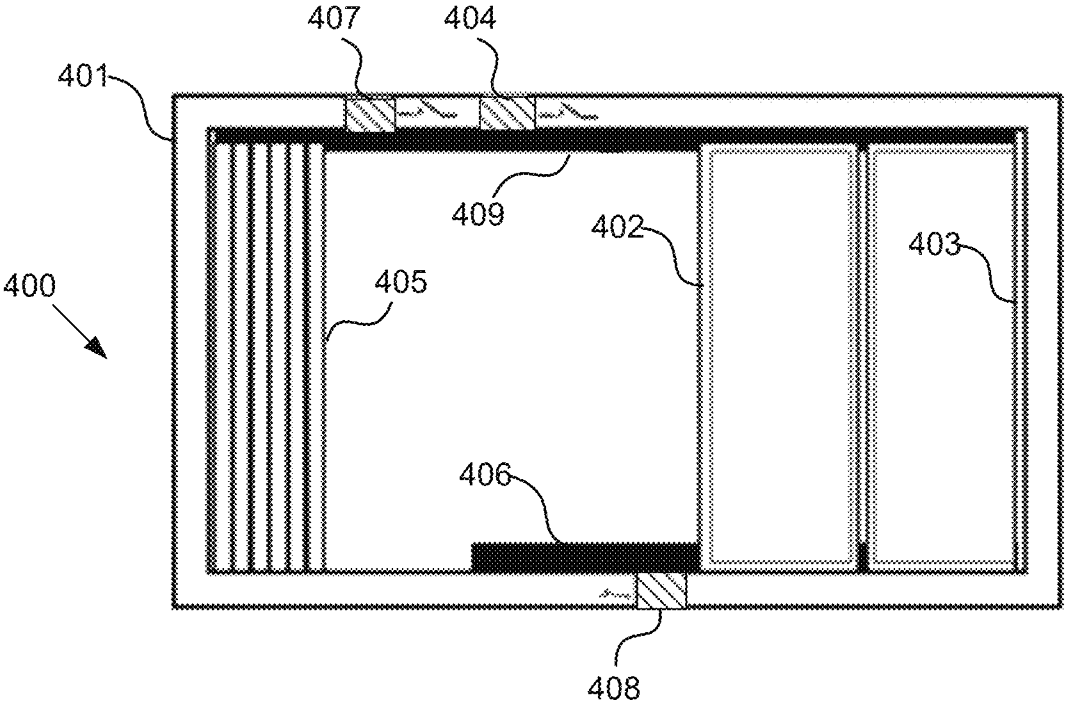
FIG. 4 illustrates a schematic representation of a monitoring mechanism of an elevator car roof system according to an example embodiment.

FIG. 4 illustrates a schematic representation of a monitoring mechanism of an elevator car roof system 400 according to an example embodiment. The elevator car roof system 400 may provide an integrated and combined system for both roof opening monitoring and person on car top detection. The elevator car roof system 400 may be used, for example, for an NHR (No Headroom) elevator application. Object detection and monitoring an opening state of the elevator car roof may be combined into the same mechanism as described.

The elevator car roof system 400 may comprise a frame 401. The elevator car roof system 400 may further comprise a plurality of movable roof panels 402, 403, 405 within the frame 401. In another example embodiment, the roof panels may be interconnected. The roof panels 402, 403, 405 may be supported by sliding rails on opposite sides of the frame 401. The elevator car roof is fully closed when all roof panels 402, 403, 405 are positioned side by side in the plane of the elevator car top frame 401. When the elevator car roof is fully closed, the plurality of roof panels 402, 403, 405 completely fills the frame 401. The elevator car roof may be opened by sliding the roof panels 402, 403, 405 to one side of the frame 401 and stowing the roof panels to the same side. The roof panels 402, 403, 405 may pivotable around their longitudinal axis such that they may be stowed in a relatively small space in relation to the space available in their sliding direction.

The roof panels 402, 403, 405 may have a rectangular shape having relatively thin side surfaces and wider top and bottom surfaces. A roof panel may be in a closed position, when the top or bottom surface of the roof panel is in the plane of the frame of the elevator car roof. A roof panel may be in an opened position when the top and bottom surfaces of the roof panel are turned away from the plane of the frame 401 around a longitudinal axis of the roof panel within the frame.

The elevator car roof system 400 may comprise a first folding lever 409 configured under the roof panels 402, 403, 405. The first folding lever 409 may be, for example, a longitudinal folding lever plate. The first folding lever 409 may be coupled on one side of the frame 401. The roof panels 402, 403, 405 may be coupled from their one end to the same side of the frame 401 as the first folding lever 409. The length of the first folding lever 409 may correspond to the length of the side of the frame 401 to which it is coupled to. Hence, the length of the first folding lever 409 may be sufficient to trigger at least one sensor 404, 407 in response to at least one of the roof panels 402, 403, 405 being tilted or a plurality of them being folded. The at least one roof panel tilted or folded away from the plane of the frame 401 may simultaneously push the first folding lever 409 downwards. The roof panel may push the first folding lever 409 from a first position to a second position which may cause the opening state sensor 407 to trigger. In response to the triggering of the opening state sensor 407, operation of the elevator may be disabled.

In an example embodiment, each of the roof panels 402, 403, 405 may comprise an element or elements enabling object detection on a roof panel or panels.

Figure 5:
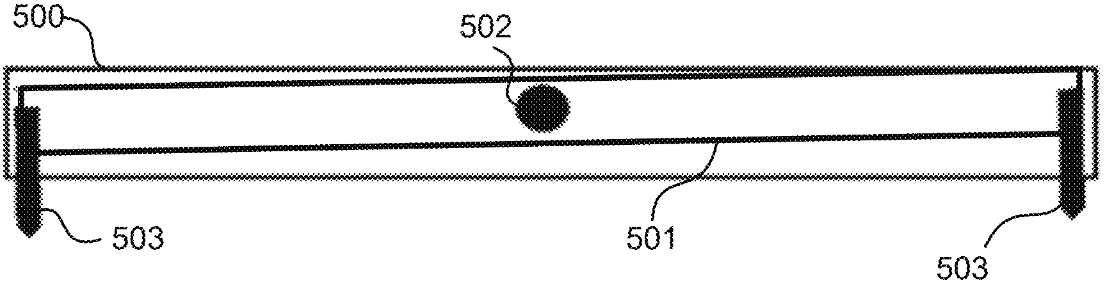
FIG. 5 illustrates a schematic representation of a roof panel comprising means for object detection according to an example embodiment.

In FIG. 5 an exemplary roof panel 500 of the elevator car roof system 400 is depicted from a side view. The side-view illustrates a short end of the roof panel 500 coupled to the same side of the frame 401 as the first folding lever 409. Each roof panel 500 of the elevator car roof system 400 may comprise a swing plate 501 coupled to a hinge 502. The swing plate 501 may comprise at least one pushing member or a pushing pin 503 located above the first folding lever 409 when the roof panel 500 is in the closed position. In an example embodiment, the swing plate 501 may comprise two pushing members or pins 503 on both sides of the short end of the roof panel 500. For example, when a person steps on the swing plate 501, one of the pushing pins 503 pushes the first folding lever 409 so that the first folding lever 409 moves or turns and triggers the sensor 404. The length of the one or more pushing pins 503 may be selected such that when they are pushed down, the first folding lever 409 may reach its intermediate position. When the first folding lever 409 is in the intermediate position, only the sensor 404 may trigger while the sensor 407 remains untriggered. Alternatively, a floating plate may be used instead of the hinged swing plate. Further, a spring or springs may be used to return the plates to their initial position when the object is removed. The spring may be coupled to the first folding lever 409.

The elevator car roof system 400 may further comprise a second folding lever 406. The second folding lever 406 may be, for example, a longitudinal folding lever plate. The second folding lever 406 may be positioned on the opposite side of the frame than the first folding lever 409. The length of the second folding lever 406 may be shorter than the length of the first folding lever 409. The second folding lever 406 may be partially extending along the length of the side of the frame 401 such that the stacking end of the roof panels 405 is not covered by the second folding lever 406. For example, the second folding lever 406 may begin from the opposite end than where the roof panels 405 are stowed and it may extend towards the stacking end such that when all the roof panels 402, 403, 405 are in the stowed position in the end, none of the roof panels 402, 403, 405 is in connection with the second folding lever 406.

The second folding lever 406 may be used to enable an indication when the elevator car roof is fully open. When all the roof panels 402, 403, 405 are slid and folded on the one end of the frame 401, the second folding lever 406 may turn upwards and trigger the fully open sensor 408. The second folding lever 406 may be spring-loaded. At least one roof panel 402, 403, 405 being at least partially aligned in with the second folding lever 406 in a vertical direction may keep the second folding lever 406 in a first position. When the second folding lever 406 is in the first position, the fully open sensor 408 may be kept untriggered by the second folding lever 406. In response to the last roof panel disconnected from the second folding lever 406, the spring may release the second folding lever 406 to a second position and trigger the sensor 408.

Compared to continuously operating object detection means on the elevator car roof, for example, a sensor on the roof frame, unnecessary stops for an elevator car may be avoided while still ensuring safety. For example, a continuously operating sensor on the roof frame may disrupt an inspection drive if a sleeve of a maintenance person blocks the sensor while working. The unnecessary disruptions may be avoided because, once it is detected that the roof is fully open, the fully open sensor 408 will override the load on roof sensor 404 and enable an inspection drive. In addition, because the object detection is implemented with the same electro-mechanical mechanism as the opening state monitoring by sensor 407, no additional costs are required by the implementation.

In FIG. 4 the roof panels 402, 403, 405 may be configured to turn in a downwards direction, but in another example embodiment the described operations may be also implemented in the opposite way such that the folding levers may trigger the sensors in response to the roof panels opening in an upwards direction.

Figure 6A:
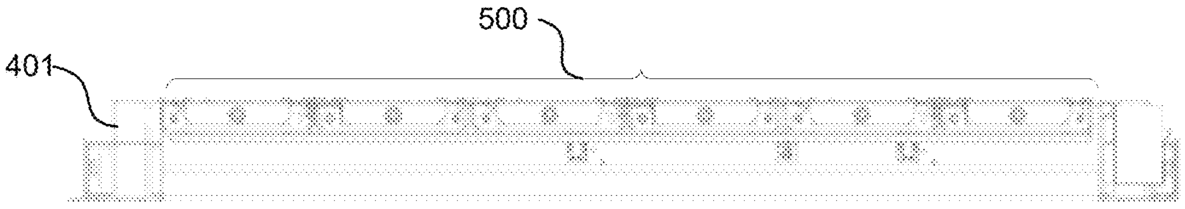
FIG. 6A illustrates a schematic representation of a cross-section of an elevator car roof system when the elevator car roof is fully closed according to an example embodiment.

FIG. 6A illustrates a schematic representation of a cross-section of an elevator car roof system when the elevator car roof is fully closed according to an embodiment.

The elevator car roof system comprises a plurality of roof panels 500 which may form a surface of the elevator car roof enclosed by the frame 401 of the elevator car top. Each of the roof panels 500 may have an identical width and the total width of the roof panels 500 may correspond to the inner length of the frame 401. When the elevator car roof is fully closed, each roof panel 500 may be in the plane of the frame 401.

Figure 6B:
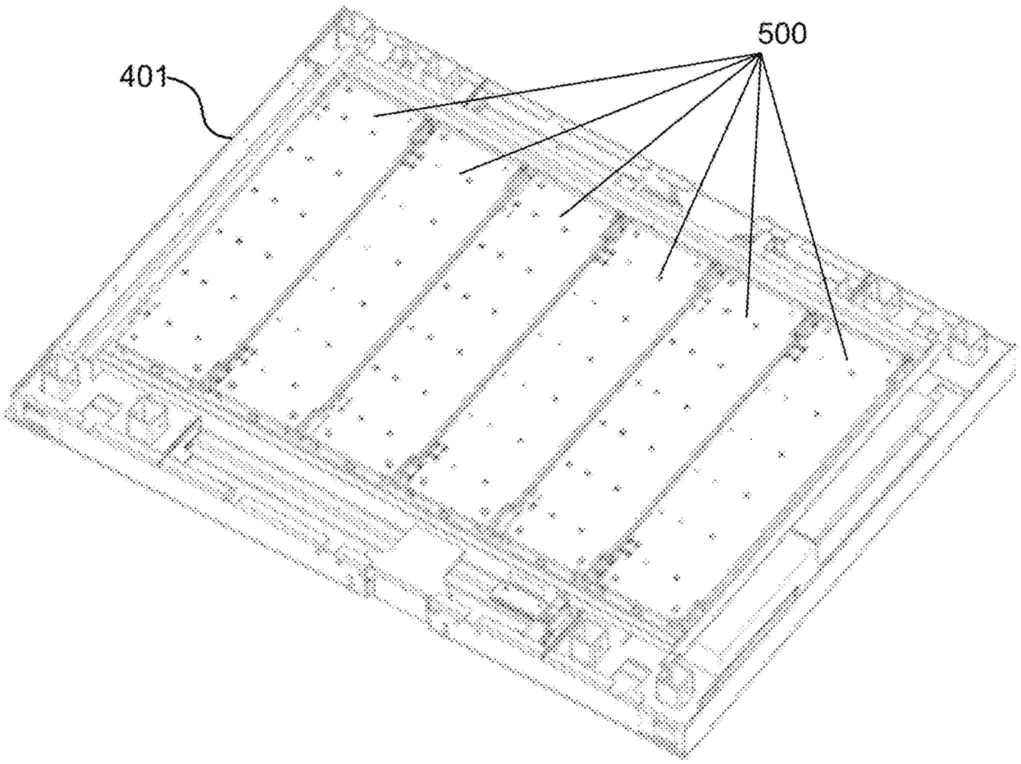
FIG. 6B illustrates a schematic representation of an elevator car roof system depicted from above when the elevator car roof is fully closed according to an example embodiment.

FIG. 6B illustrates the elevator car roof service access depicted from above when the elevator roof is fully closed according to an embodiment. Each roof panel 500 may be longer in one dimension than in the other, and the length and width of the panels may depend on the dimensions of the frame 401. The length of the roof panels 500 may correspond to the inner width of the frame 401. When the elevator car roof is fully closed, the roof panels may form a substantially flat surface.

Figure 6C:
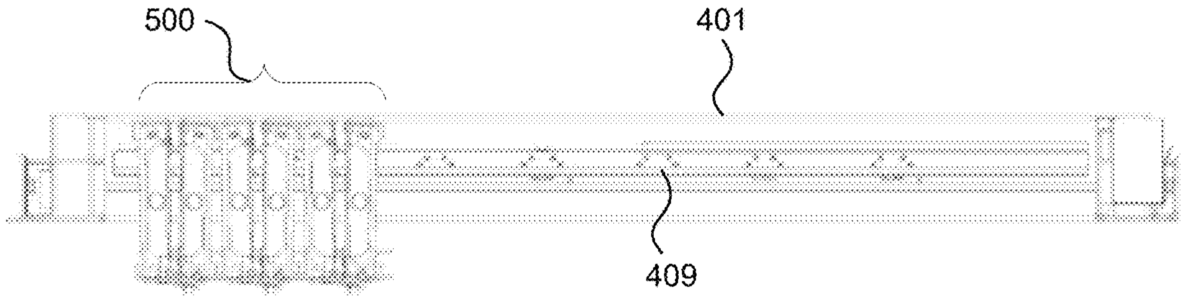
FIG. 6C illustrates a schematic representation of a cross-section of an elevator car roof system when the elevator car roof is fully open according to an example embodiment.
Figure 6D:
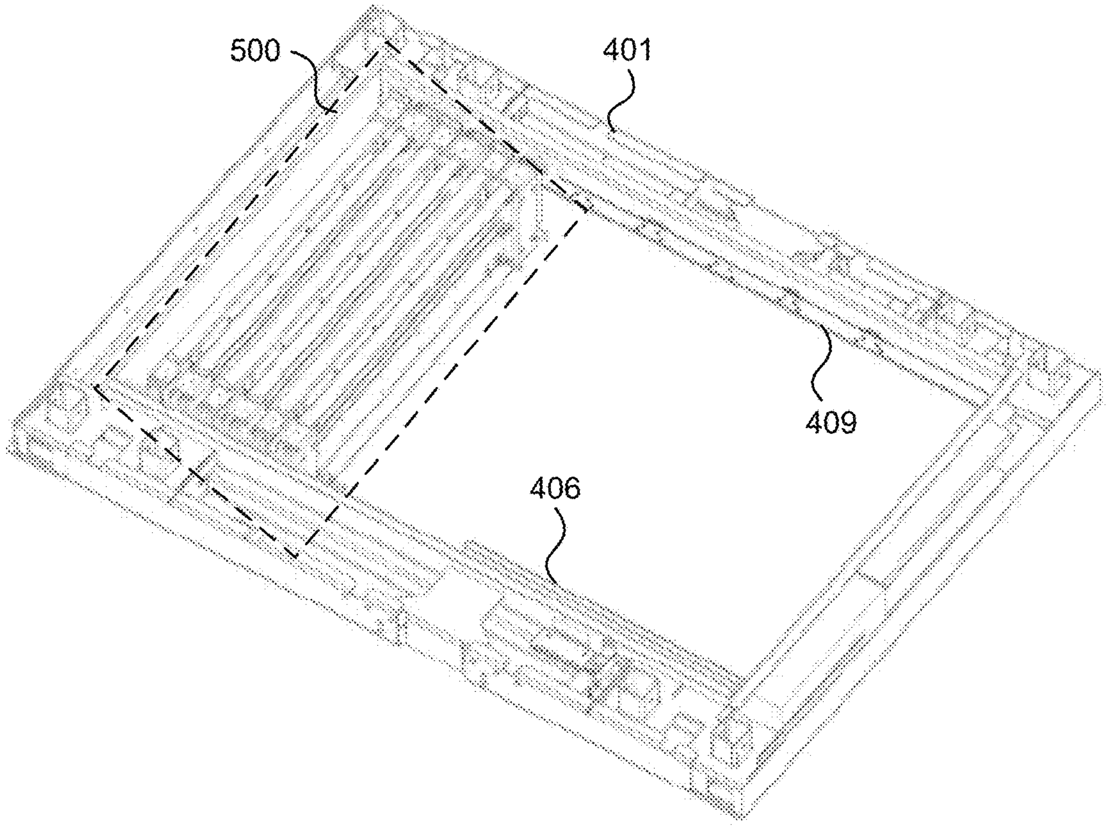
FIG. 6D illustrates a schematic representation of an elevator car roof system depicted from above when the elevator car roof is fully open according to an example embodiment.

FIG. 6C illustrates a schematic representation of a cross-section of an elevator car roof system when the elevator car roof is fully open according to an example embodiment. FIG. 6D illustrates the elevator car roof system depicted from above. When the elevator car roof is fully open, all roof panels 500 are stowed aside on one end of the frame 401, each tilted to an upright position. When the roof panels 500 are stowed, they may be in a substantially perpendicular position in relation to the frame 401. Hence, a sufficient space for service access may be provided as the elevator car roof may be folded to side without blocking a view to an elevator shaft.

The elevator car roof system may comprise the first folding lever 409 for monitoring a partially open state of the car roof. The first folding lever 409 may extend through the whole length of the side of the frame 401. The first folding lever 409 may fold downwards in response to at least one of the roof panels 500 being tilted to the upright position. In response, the first folding lever 409 may trigger the sensor 407 configured to disable any movement of the elevator car. The elevator car roof system may further comprise the second folding lever 406 for monitoring a fully open state of the car roof. The second folding lever 406 may be coupled on opposite side of the frame 401 than the first folding lever 409. The length of the second folding lever 406 may be shorter than the length of the side of the frame 401. The second folding lever 406 may fold upwards in response to all the roof panels 500 being stowed aside on the one end of the frame 401. The second folding lever 406 may not extend to the stacking end of the roof panels 500. The second folding lever 406 may trigger the sensor 408 (i.e. the fully open sensor) configured to override sensors 404 and 407, thus enabling an inspection drive of the elevator. A roof panel positioned at least partially on top of the second folding lever 406 may obstruct the upward movement of the second folding lever 406. Hence, when all roof panels are not stowed aside, the second 408 may not be triggered.

FIGS. 7A-7D illustrate a schematic representation of sequences for detecting an object and monitoring an opening state of an elevator car roof in an elevator car roof system according to an example embodiment.

The elevator car roof system may comprise a plurality of jointly or separately movable roof panels 500 configured within a frame 401 of an elevator car top. The elevator car roof system may further comprise the monitoring mechanism for monitoring opening state of the elevator car roof and a configuration for object detection as described earlier.

Figure 7A:
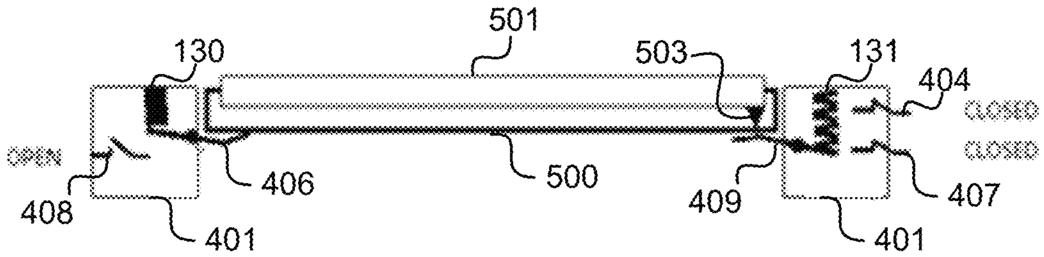
FIGS. 7A-7D illustrate a schematic representation of sequences for detecting an object and monitoring an opening state of an elevator car roof in an elevator car roof system according to an example embodiment.

In FIG. 7A, the elevator car roof is fully closed. Each of the roof panels 500 is in a closed position in a plane of the frame 401 and positioned side by side in the frame 401. The first folding lever 409 is in an upward first position and the sensors, such as the switches 404, 407 coupled with the first folding lever 409, are closed. On the opposite side of the first folding lever 409, the second folding lever 406 is in a downward first position and the switch 408 coupled with the second folding lever 406 is open.

Figure 7B:
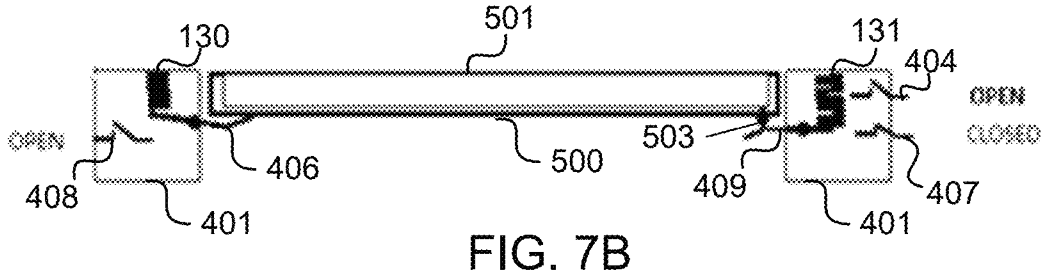

In FIG. 7B, the elevator car roof is still fully closed, but a person may be standing on the roof panel 500. The roof panel 500 may comprise a floating plate 501 comprising at least one pushing member or pin 503. The weight on the roof panel 500 may cause the at least one pushing pin 503 to push the first folding lever 409 downwards to an intermediate position which causes the switch 404 to open. Hence, the elevator car roof system may detect an object on the car roof in response to the changed state of the switch 404. In response to the opened switch 404, the operation of the elevator may be disabled. Switches 407 and 408 remain in their initial state and therefore an inspection drive may not be allowed.

Figure 7C:
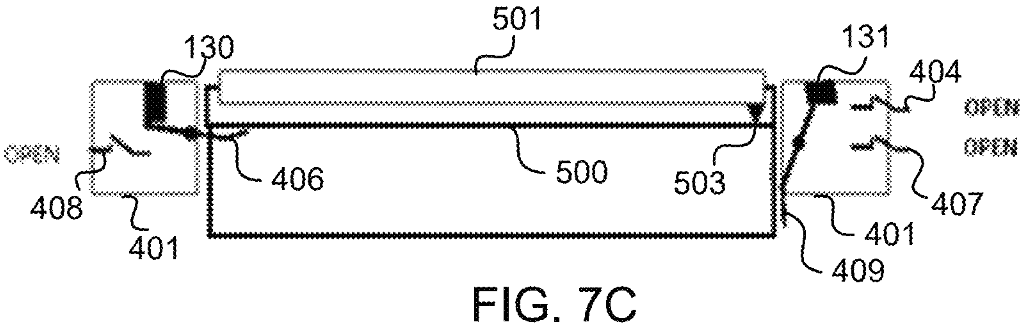

In FIG. 7C, at least one roof panel 405 is in an opened position where the at least one roof panel 405 has turned such that a top surface of the panel is no longer in the plane of the frame 401. The turned roof panel or panels 405 may push the first folding lever 409 downwards to position a second past the intermediate position such that the first folding lever 409 causes both the switch 404 and the switch 407 to open. In response to the changed states of the switches 404, 407, normal operation of the elevator may be disabled by the elevator car roof system. However, when at least one roof panel 500 remains in the closed position, the switch 408 may remain open and inspection drive is not allowed. The person on top of the roof panel 500 may have left, and therefore the floating plate 501 may have returned to its initial position.

The open and closed states of the switches 404, 407 and 408 refer to their connective states as parts of the elevator safety circuit, the switch 408 in closed, connective state overriding the switches 404 and 407 for enabling inspection drive.

Figure 7D:
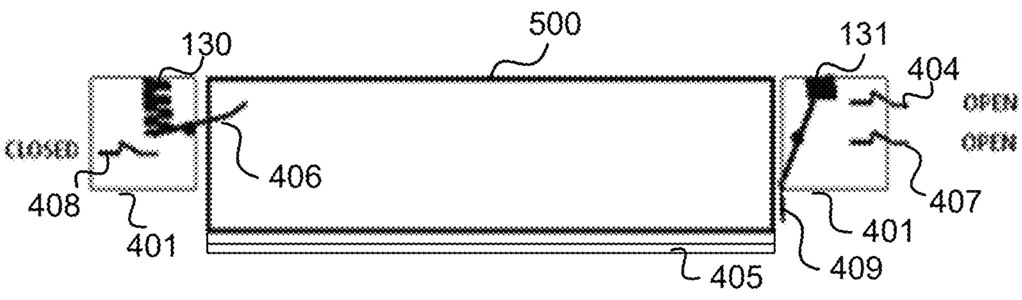

In FIG. 7D, all the roof panels 405, 500 within the frame 401 have been turned and stowed aside on one end of the frame 401. In response to the last roof panel sliding away from the top of the second folding lever 406, the second folding lever 406 may lift up and cause the switch 408 to close. When the switch 408 is closed, an inspection drive may be allowed by the elevator car roof system, while the normal movement of the elevator may be disabled.

Figure 8A:
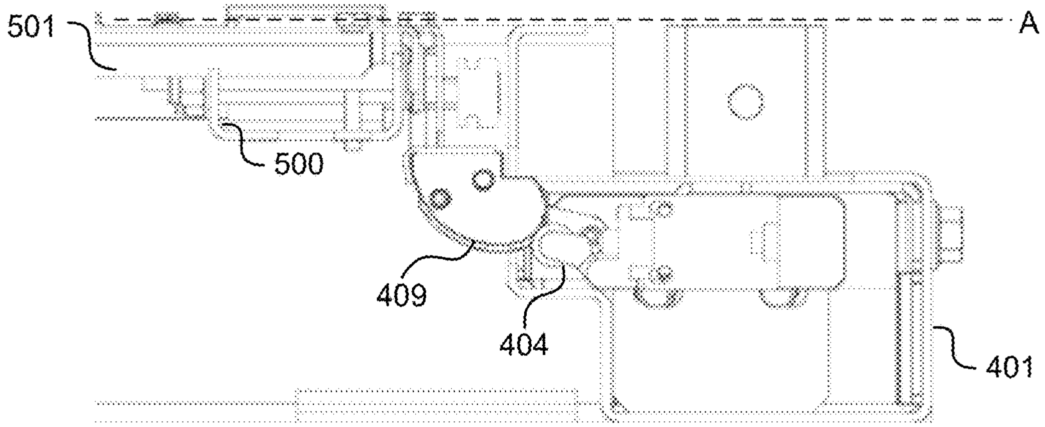
FIG. 8A illustrates a schematic representation of a first folding lever in a first position when an elevator car roof is fully closed according to an example embodiment.

FIG. 8A illustrates a schematic representation of the first folding lever 409 in a first position when an elevator car roof is fully closed according to an example embodiment. The first folding lever 409 may remain in the first position while each roof panel 500 and the respective swing plate 501 is in a horizontal position in a plane A of the roof panel 500. The first switch 407 may be kept in a closed state when the first folding lever 409 is in the first position.

Figure 8B:
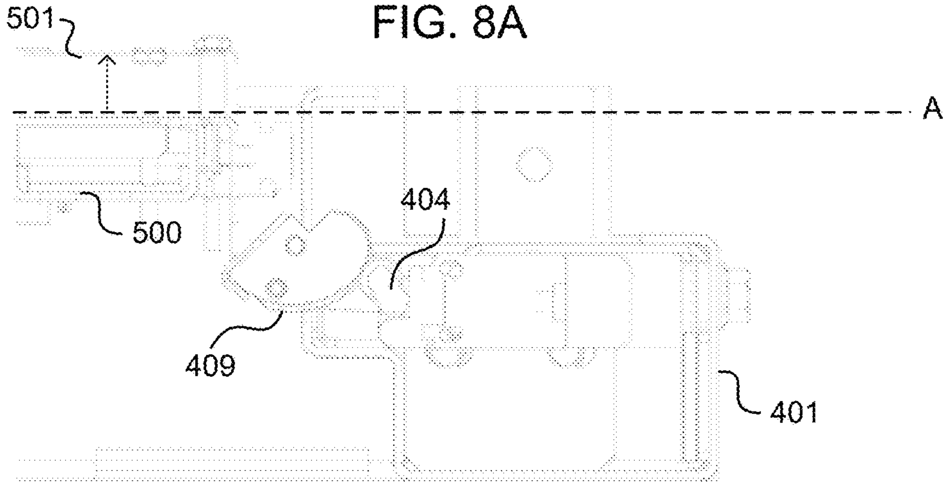
FIG. 8B illustrates a schematic representation of a first folding lever in an intermediate position when there is an object on an elevator car roof according to an example embodiment.

FIG. 8B illustrates a schematic representation of the first folding lever 409 in an intermediate position when there is an object on the elevator car roof according to an example embodiment. The weight of the object may cause the swing plate 501 to move from the plane A of the roof panel 500. For example, one side of the swing plate 501 may lift and the other side to drop. The changed position of the swing plate 501 may cause the first folding lever 409 to move such that switch 404 opens but the switch 407 is still closed.

Figure 8C:
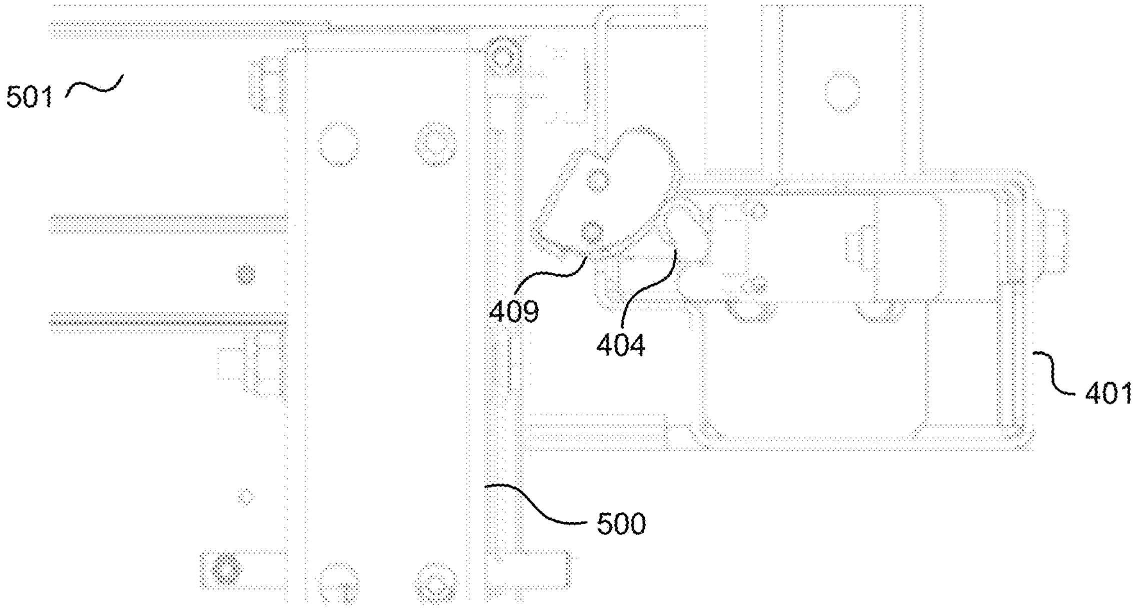
FIG. 8C illustrates a schematic representation of a first folding lever in a second position when an elevator car roof is at least partially open according to an example embodiment.

FIG. 8C illustrates a schematic representation of the first folding lever 409 in a second position when the elevator car roof is at least partially open according to an embodiment. The roof panel 500 may have opened by turning to an upright position. Simultaneously, the first folding lever 409 may be pushed by the roof panel 500 to a second position. The changed position of the first folding lever 409 may cause the switch 407 (not shown in figure) to open while switch 404 remains open, as illustrated in FIG. 8C.

Figure 8D:
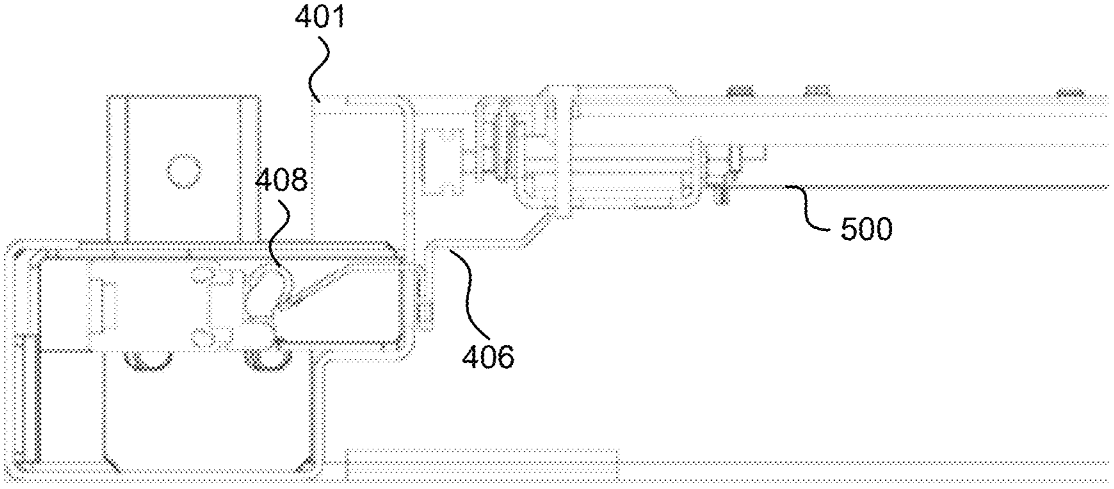
FIG. 8D illustrates a schematic representation of a second folding lever in a first position when an elevator car roof is fully open according to an example embodiment.

FIG. 8D illustrates a schematic representation of the second folding lever 406 in a first position when an elevator car roof is not completely open according to an example embodiment. At least one roof panel 500 in a closed position on the plane of the frame 401 retains the second folding lever 406 in a downwards position. The downwards position of the second folding lever 406 may keep the switch 408, coupled with the second folding lever 406, in an open position. Hence, the second folding lever 406 and the coupled switch 408 indicate the positions of the roof plates and that the elevator car roof is not fully open.

Figure 8E:
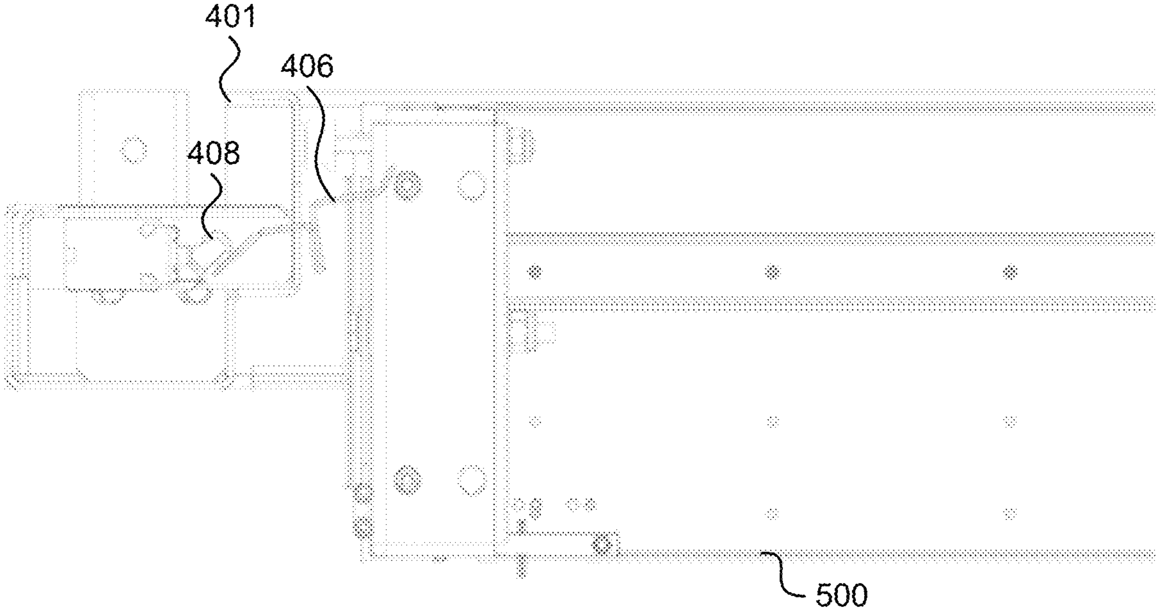
FIG. 8E illustrates a schematic representation of a second folding lever in a second position when an elevator car roof is fully open according to an example embodiment.

FIG. 8E illustrates 406 schematic representation of the second folding lever 507 in a second position when the elevator car roof is fully open according to an example embodiment. When each roof plate 500 is turned to an upright position and away from the position of the second folding lever 406, none of the roof panels 500 may keep the second folding lever 406 in the downward position. Therefore, the second folding lever 406 may rise to an upright position. In the upright position, the second folding lever 406 may allow the switch 408 to close. In response to the closed switch 408, an inspection drive of the elevator may be allowed.

Figure 9:
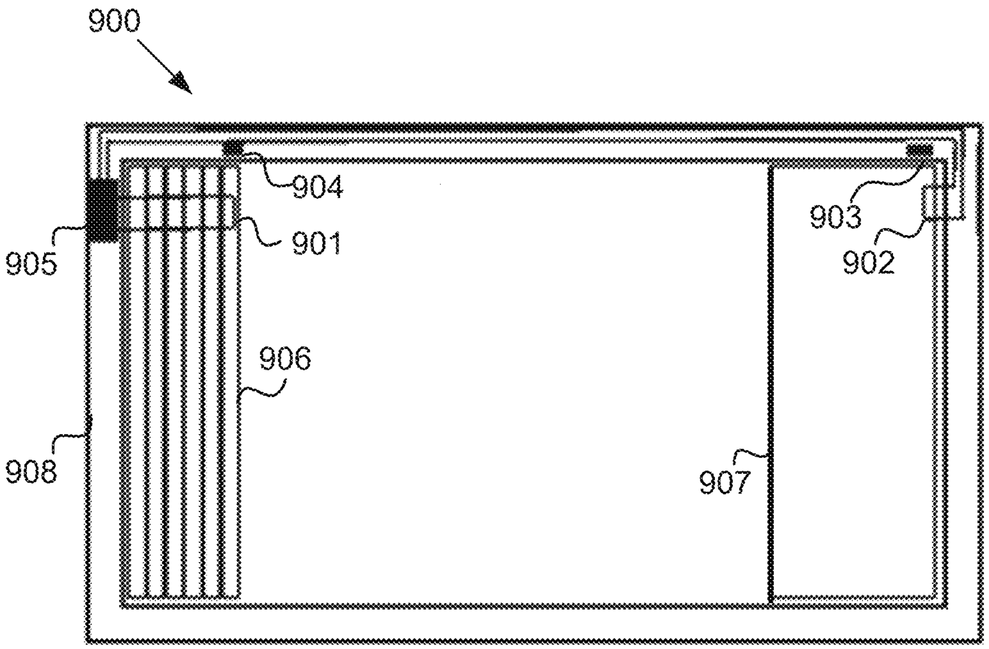
FIG. 9 illustrates a schematic representation of a monitoring mechanism of an elevator car roof system according to another example embodiment.

FIG. 9 illustrates a schematic representation of a monitoring mechanism of an elevator car roof system 900 according to another example embodiment.

The elevator car roof system 900 may comprise a plurality of separately movable roof panels 906, 907 configured within a frame 908 of an elevator car top. The roof panels 906, 907 may be coupled to sliding rails configured on opposite sides of the frame 908. Each of the roof panels may have a relatively thin rectangular shape having side surfaces and top and bottom surfaces. Each of the roof panels 906, 907 may turn around their longitudinal axis such that the roof panel is in a closed position when the top surface of the panel is in a plane of the frame 908 and in an opened position when the top surface of the panel is not in the plane of the frame 908. The roof panels 906, 907 may turn, for example, 360 degrees, 180 degrees, or preferably at least 90 degrees.

The elevator car roof system 900 may comprise at least two sensors 903, 904 for roof opening monitoring. In an example embodiment, at least one of the sensors 903, 904 may be a safety contact. In an embodiment, at least one of the sensors 903, 904 may be a magnetic switch. In an embodiment, at least one of the sensors 903, 904 may be a roll safety switch.

In an example embodiment, the elevator car roof system 900 may detect that the elevator car roof is fully open when all the roof panels 906, 907 are stowed aside on one end of the frame 908. When all the panels 906, 907 are stowed aside on the one end, a safety circuit 901 on top or below the panel stack is closed. The circuit 901 may be coupled to a first sensor 904. When the roof is at least partially closed, at least one roof panel 907 is in a closed position. The at least one roof panel 907 may close a second safety circuit 902 located on the opposite end of the frame 908 than the first safety circuit 901. Closing the second safety circuit 902 may cause the second sensor 903 to trigger. Alternatively, each roof panel 906, 907 may be coupled to a separate switch for indicating if the panel is closed. The sensors 903, 904 and the respective safety circuits 902, 901 may be coupled to a car connection board 905 on the frame 908. Input from the sensors 903, 904 may be provided via the connection board 905, for example, to a control system of the elevator to at least one of enable only normal elevator operation, enable only inspection drive of the elevator, or disable normal elevator operation.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations described herein may be carried out in any suitable order, or simultaneously where appropriate. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or elevator car roof system may contain additional blocks or elements.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope defined by the claims.

The invention claimed is:

1. An elevator car roof system comprising:
- a plurality of movable roof panels forming an elevator car roof;
- at least one sensor configured to indicate positions of the roof panels and to detect an object on any roof panel, the positions comprising at least a first state in which the roof is fully closed, a second state in which the roof is fully open and a third state in which the roof is partially open; and
- a control unit,
- wherein the control unit is configured to enable normal elevator operation based on at least one signal received from the at least one sensor only in the first state when no object is detected on the roof,
- wherein the control unit is configured to, based on at least one signal received from the at least one sensor, disable any elevator operation in the third state or when the object is detected on the roof, and
- wherein the control unit is configured to enable an elevator inspection drive based on at least one signal received from the at least one sensor only in the second state.

2. The elevator car roof system of claim 1, wherein the roof is partially open when at least one roof panel has turned away from a plane of an elevator car roof relative to a longitudinal axis of the roof panel.

3. The elevator car roof system of claim 1, wherein the roof is fully open when all roof panels have turned away from the plane of the elevator car roof relative to a longitudinal axis of the roof panels and moved to one side of an opening of the elevator car roof.

4. The elevator car roof system of claim 1, wherein the roof is fully closed when the roof panels are positioned side by side in the same plane, covering an entire area of an opening of the elevator car roof.

5. The elevator car roof system of claim 1, wherein the at least one sensor comprises a first sensor, a second sensor and a third sensor, the system further comprising:
- a frame of the elevator car roof;
- a first folding lever movably coupled to one side of the frame; and
- a second folding lever movably coupled on the opposite side of the frame than the first folding lever,
- wherein the first folding lever is configured to enable triggering of at least one of the first sensor and the second sensor, and
- wherein the second folding lever is configured to enable triggering of the third sensor.

6. The elevator car roof system of claim 5, wherein in the first state and when weight is applied on any of the roof panels, the first folding lever is configured to trigger the first sensor.

7. The elevator car roof system of claim 5, wherein in the third state, the first folding lever is configured to trigger the first sensor and the second sensor.

8. The elevator car roof system of claim 5, wherein in the second state, the second folding lever is configured to trigger the third sensor to override the first sensor and the second sensor, to enable an inspection drive.

9. The elevator car roof system of claim 6, further comprising:
- at least one pushing member associated with each roof panel arranged to face the first folding lever,
- wherein when weight is applied in the first state, the at least one pushing member is configured to move the first folding lever and in response to the movement, the first folding lever is configured to trigger the first sensor.

10. The elevator car roof system of claim 6, wherein the first folding lever extends along an entire side of the frame.

11. The elevator car roof system of claim 6, wherein the second folding lever extends only partially along the side of the frame.

12. A control system of an elevator, configured to:
- receive at least one signal from at least one sensor of the elevator car roof system of claim 1; and control operation of the elevator based on the at least one signal.

13. An elevator comprising:

the elevator car roof system of claim 1; and a control system, wherein the control system is configured to:

receive at least one signal from the at least one sensor of the elevator car roof system; and control operation of the elevator based on the at least one signal.

14. The elevator car roof system of claim 2, wherein the roof is fully open when all roof panels have turned away from the plane of the elevator car roof relative to the longitudinal axis of the roof panels and moved to one side of an opening of the elevator car roof.

15. The elevator car roof system of claim 2, wherein the roof is fully closed when the roof panels are positioned side by side in the same plane, covering an entire area of an opening of the elevator car roof.

16. The elevator car roof system of claim 3, wherein the roof is fully closed when the roof panels are positioned side by side in the same plane, covering the whole area of the elevator car roof opening.

17. The elevator car roof system of claim 2, wherein the at least one sensor comprises a first sensor, a second sensor and a third sensor, the system further comprising:

a frame of the elevator car roof;

a first folding lever movably coupled to one side of the frame; and a second folding lever movably coupled on the opposite side of the frame than the first folding lever, wherein the first folding lever is configured to enable triggering of at least one of the first sensor and the second sensor, and wherein the second folding lever is configured to enable triggering of the third sensor.

18. The elevator car roof system of claim 3, wherein the at least one sensor comprises a first sensor, a second sensor and a third sensor, the system further comprising:

a frame of the elevator car roof;

a first folding lever movably coupled to one side of the frame; and a second folding lever movably coupled on the opposite side of the frame than the first folding lever, wherein the first folding lever is configured to enable triggering of at least one of the first sensor and the second sensor, and wherein the second folding lever is configured to enable triggering of the third sensor.

19. The elevator car roof system of claim 4, wherein the at least one sensor comprises a first sensor, a second sensor and a third sensor, the system further comprising:

a frame of the elevator car roof;

a first folding lever movably coupled to one side of the frame; and a second folding lever movably coupled on the opposite side of the frame than the first folding lever, wherein the first folding lever is configured to enable triggering of at least one of the first sensor and the second sensor, and wherein the second folding lever is configured to enable triggering of the third sensor.

20. The elevator car roof system of claim 7, wherein the first folding lever extends along an entire side of the frame.

* * * * *